United States Patent [19]
Nelson, Jr. et al.

[11] Patent Number: 5,094,525
[45] Date of Patent: Mar. 10, 1992

[54] SYSTEM FOR PROJECTING KALEIDOSCOPIC IMAGES FOR GROUP VIEWING USING A DYNAMICALLY OPERATING KALEIDOSCOPE AS AN INTEGRAL ELEMENT

[76] Inventors: Paul A. Nelson, Jr.; Paul A. Nelson, Sr., both of P.O. Box 928, Angwin, Calif. 94508

[21] Appl. No.: 563,097

[22] Filed: Aug. 3, 1990

[51] Int. Cl.$^5$ ............................................. G03B 21/00
[52] U.S. Cl. ......................................... 353/1; 353/2; 359/617
[58] Field of Search .................. 353/1, 2; 350/4.1, 4.2

[56] References Cited

U.S. PATENT DOCUMENTS

| | | | |
|---|---|---|---|
| 2,038,909 | 4/1936 | Smith et al. | 353/2 |
| 2,152,424 | 3/1939 | Westmore | 353/2 |
| 2,762,257 | 9/1956 | Beguelin nee Vacher | 353/2 |
| 4,247,181 | 1/1981 | Inness-Brown | 353/1 |

FOREIGN PATENT DOCUMENTS

| | | | |
|---|---|---|---|
| 1193342 | 3/1962 | France | 353/2 |
| 0681409 | 8/1979 | U.S.S.R. | 353/1 |

*Primary Examiner*—William A. Cuchlinski, Jr.
*Assistant Examiner*—William C. Dowling
*Attorney, Agent, or Firm*—Harold D. Messner

[57] ABSTRACT

The present invention relates to a projecting kaleidoscopic system for viewing kaleidoscopic images on a screen external of a conventional kaleidoscope. In one form, the system includes: (i) a high intensity lamp; (ii) a conventional kaleidoscope positioned in optical alignment with the lamp and including a tube of circular cross section having a longitudinal axis of symmetry, an eye piece at one end and an object box at an opposite end, the box including transparent wall means pointed at the lamp defining a cavity means filled with a multiplicity of loosely assorted pattern producing objects and reflector means within the tube between the eye piece and the transparent wall means wherein the tube, eye piece and object box provide a kaleidoscope that is a separately marketable unit product in and of itself; (iv) drive means mounted in frictional contact with the kaleidoscope for sole support thereof held in such contact by gravity alone wherein the kaleidoscope as a separately marketable unit can be evaluated, the drive means rotating the kaleidoscope about its axis of symmetry at relatively low RPM; (iv) optical lens and focusing means external of the kaleidoscope for optically receiving, enlarging and projecting the kaleidoscopic images appearing at the eye piece; and (v) a rear projection screen means external of the kaleidoscope for viewing the images whereby group viewing is enjoyed.

17 Claims, 2 Drawing Sheets

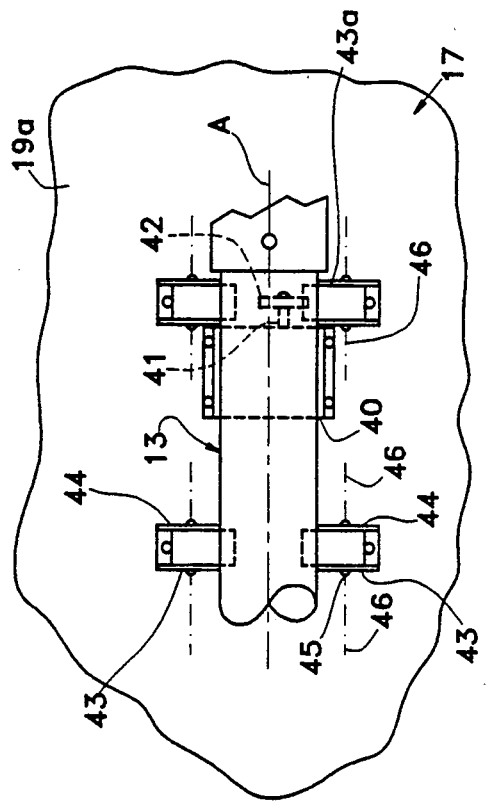
Fig. 2
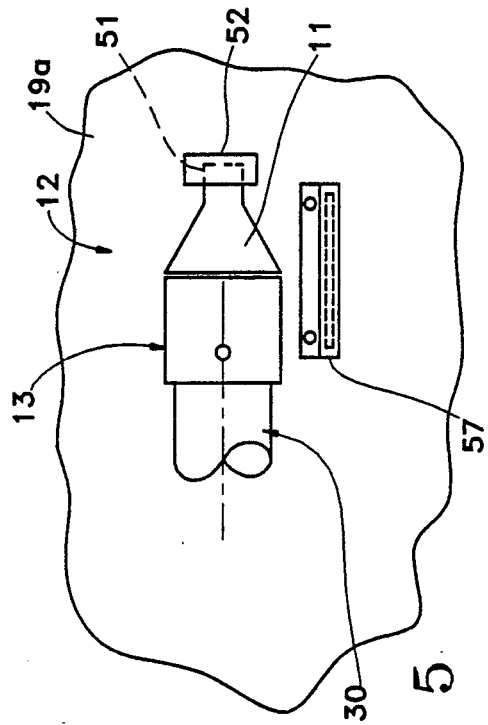
Fig. 4
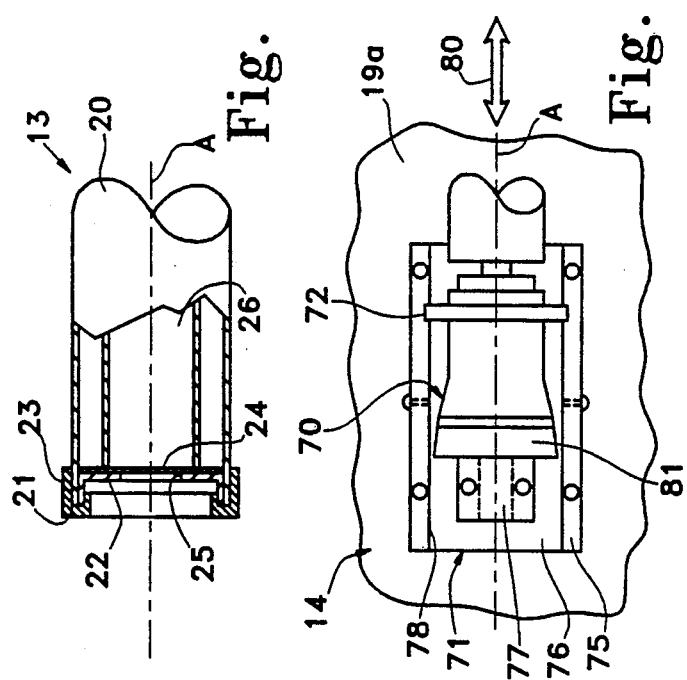
Fig. 6
Fig. 3
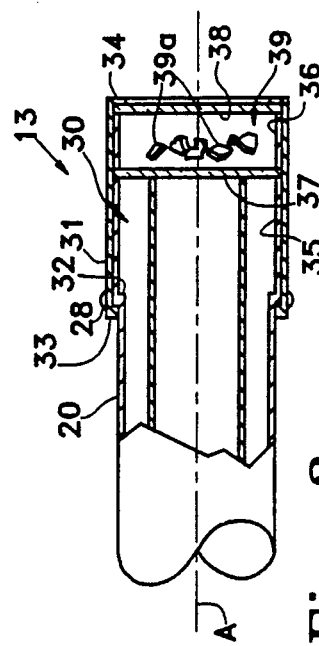
Fig. 5

SYSTEM FOR PROJECTING KALEIDOSCOPIC IMAGES FOR GROUP VIEWING USING A DYNAMICALLY OPERATING KALEIDOSCOPE AS AN INTEGRAL ELEMENT

SCOPE OF THE INVENTION

The present invention relates to kaleidoscopes and in particular to a system for projecting kaleidoscopic images for viewing by a group (more than a single person) using a dynamically operating kaleidoscope as an integral element of the system. In one aspect, the system optically projects a beam of high intensity light through a fully operational and separately marketable hand-held kaleidoscope to demonstrate its kaleidoscopic characteristics on a dynamic basis. In another aspect, the system projects kaleidoscopic images on a continuous basis.

BACKGROUND OF THE INVENTION

Kaleidoscopes of various forms and embodiments are well known in the art. In this simplest form, the hand-held kaleidoscope includes a cylinder in which reflective mirrors extend longitudinally with the mirrors being at an angle of which 360 degree is a multiple. One end of the cylinder has a cover provided with an eyepiece, while at the far end, the cylinder is closed by two spaced discs between which colored objects are loosely located usually in a separately rotatable box-like cavity (usually called an object box). The latter discs are transparent and translucent such that light can enter the far end of the cylinder. When the hand-held kaleidoscope is held to a person's eye with the far end pointed to a source of light (artificial or natural), the colored objects between the transparent discs and within the angle of the mirrors are viewed as a primary image, but simultaneously with an angular array of reflected images. Rotating the object box, results in changes in the pattern of the images.

While hand-held kaleidoscopes have retained their standings as a favorite toy, their effect is usually limited to one person's edification and inspiration. In many cases, an enhancement of such images is desirable. For example, in the marketing of such kaleidoscopes, if the images could be enlarged to permit a group to view the hand-held kaleidoscopes on a continuous basis, then sales to both distributors and retailers could be enhanced. Also, creators of textiles, jewellery and the like that use kaleidoscopic images for inspiration, can be helped by such group presentations.

SUMMARY OF THE INVENTION

The present invention relates to a projecting kaleidoscopic system for viewing kaleidoscopic images on a screen external of a conventional kaleidoscope. In one form, the system includes:

(i) a high intensity lamp;

(ii) a kaleidoscope positioned in optical alignment with the lamp and including a tube of circular cross section having a longitudinal axis of symmetry, an eye piece at one end, an object box at an opposite end including transparent wall means pointed at the lamp and defining a cavity filled with a multiplicity of loosely assorted, movable pattern producing objects of irregular shape, and reflector means within the tube between the eye piece and transparent wall means for providing kaleidoscopic images at the eye piece of the pattern producing objects wherein the objects and transparent wall means adjacent to the lamp having a relatively high melting temperature to withstand heat generated by the lamp, (iii) drive means in frictional contact with the kaleidoscope for rotating kaleidoscope about its axis of symmetry at relatively low RPM, (iv) optical lens and focusing means external of the kaleidoscope for optically receiving, enlarging and projecting the kaleidoscopic images appearing at the eye piece, (v) a rear projection screen means external of the kaleidoscope for viewing the enlarged kaleidoscopic images on a side opposite to original image impingement on a continuous basis whereby group viewing of the projected kaleidoscopic images can be enjoyed and wherein the projected kaleidoscopic images are of increased lateral and transverse dimension that remains substantially constant as the latter images change as a function of rotation of the kaleidoscope.

DETAILED DESCRIPTION OF THE DRAWINGS

FIG. 2 is a detail side view, partially cut-away, of the hand-held kaleidoscope of FIG. 1 illustrating the eye piece, transparent wall means and a compound mirror;

FIG. 3 is a detail side view, paritally cut-away, of the hand-held kaleidoscope of FIG. 1 illustrating the object box, transparent wall means thereof adjacent to the compound mirror;

FIG. 4 is a detail plan view of the driving assembly of the kaleidoscopic system of FIG. 1;

FIG. 5 is a detail plan view of the lighting asembly of the kaleidoscopic system of FIG. 1;

FIG. 6 is a detail plan view of the diverging lens and focusing assembly of the kaleidoscopic system of FIG. 1.

DETAILED DESCRIPTION OF THE INVENTION

Figure 1:
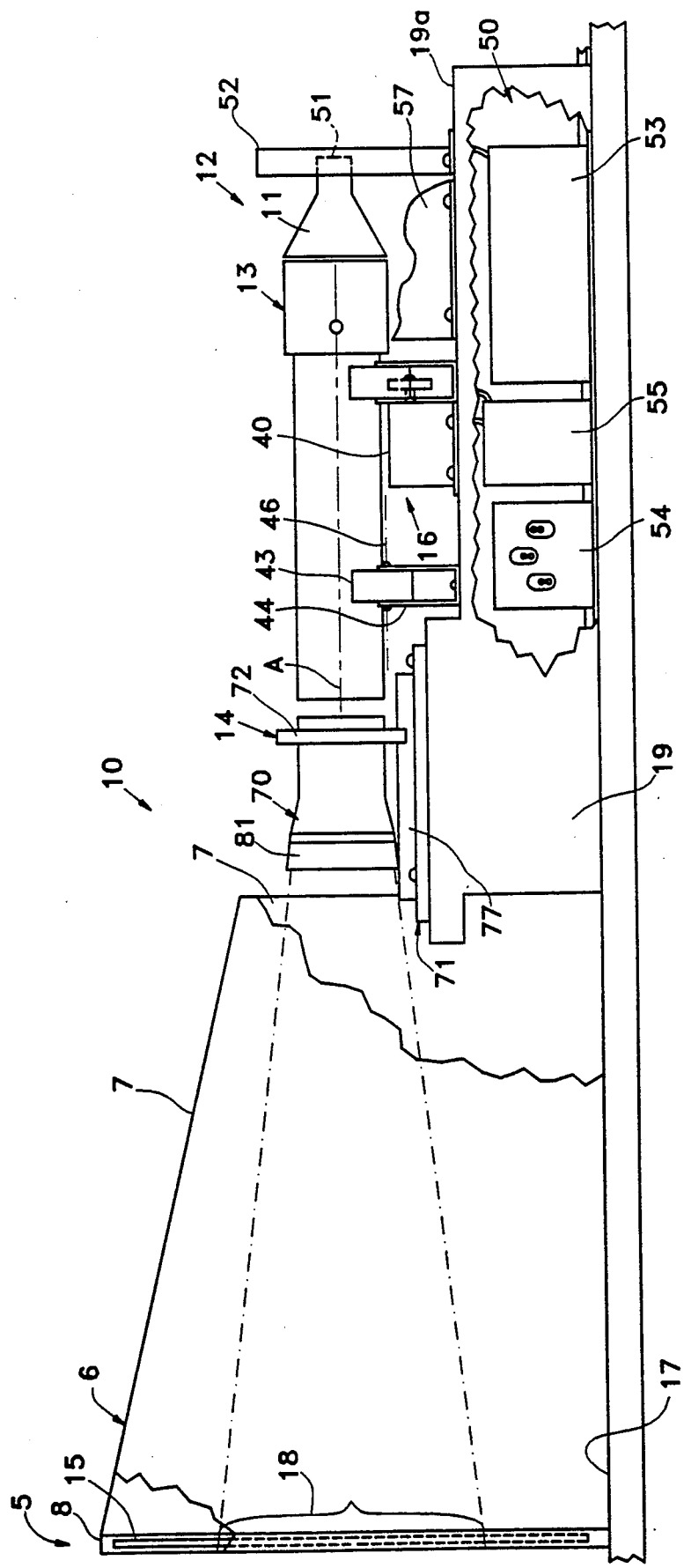
FIG. 1 is a side elevation, partially cut-away, of the system of the present invention for optically projecting a beam of high intensity light through a fully operational and separately marketable hand-held kaleidoscope and thence onto a viewing screen to demonstrate its kaleidoscopic characteristics on a dynamic basis.

FIG. 1 illustrates system 10 of the present invention for optically projecting a beam of high intensity light from a directional focused lamp 11 of a lighting assembly 12 through a fully operational and separately marketable hand-held kaleidoscope 13, thence via a diverging lens and focusing assembly 14 onto a viewing screen 15 of a viewing system 5. As the light passes through the kaleidoscope 13, a driving assembly 16 causes the entire kaleidoscope 13 to slowly rotate at low RPM, say two revolutions per minute. As a result, an increased lateral and transverse kaleidoscopic image 18 is produced at screen 15 that is constantly changing to demonstrate the characteristics of the kaleidoscope 13 on a dynamic basis. In this regard, note that the viewing system 5 includes U-shaped chamber 6 having side walls 7 and an end frame 8 that is slotted to receive the screen 15. The screen 15 uses coated materials to permit rear viewing from the side opposite to original image impingement and is available from Daylite Projections, Polycoat Division, Cincinnati, Ohio. Further note that the kaleidoscopic system 10 of the present invention is supported on a planar support 17, such as table. Positioned on the table 17 opposite to the viewing system 5 is a raised housing 19 that includes a planar platform 19a to which many of the elements comprising the system 10, are positioned for easy transport. A separate cover for the housing 19 (not shown) including appending latches and handle can be provided to ease such transport.

FIGS. 2 and 3 illustrate the kaleidoscope 13 in more detail.

As shown in FIG. 2, the kaleidoscope 13 includes an elongated tubular body or shell 20 having an axis of symmetry A as well as being provided at end 21 with a closure wall 22 of L-shaped cross section and a U-shaped closure band 23. The closure band 23 is attached to the end of the shell 20 and to closure wall 22 by an adhesive. Disposed in facewise engagement with closure wall 22 is a transparent cover plate 24 made of glass in alignment with aperture 25 of the closure wall 22. Positioned in shell 20 and against cover plate 24 is compound mirror 26 of the type usually found in kaleidoscopes. The mirror 26 extends lengthwise along adxis of symmetry A from the cover plate 24 (usually called the eye piece region) toward the far end of the kaleidoscope 13 (usually called the objective end).

As shown in FIG. 3, the kaleidoscope 13 also includes an object box generally indicated at 30 that is of larger diameter than the shell 20. The object box 30 comprises a cylindrical outer wall 31 attached to the shell 20 at flange 32 of the latter. In this regard, flange 32 is formed by crimping the shell 20 in an outward direction which meets an oppositely formed flange 33 of the outer wall 31. Forward of the flange 33 is an opposite flange 34 of the wall 31. Positioned between the flanges 33, 34 is a pair of collars 35, 36 that secure transparent transverse discs 37, 38 in axial alignment. Between the discs 37, 38 is a box-like cavity 39 filled with objects 39a of irregular shape. The objects 39a as well as disc 37, 38 must have a relatively high melting temperature to withstand the heat generated by the lamp 11 of the lighting assembly 12 when the system 10 of the invention is in continuous operation. In this regard, the objects 39a are preferably formed of hand-blown, high temperature glass and/or gemstones such as rose quartz and amethyst. The discs 37, 38 are formed of heat resistant glass. Note that the object box 30 is usually rotated about axis of symmetry A while the shell 11 remains stationary. In addition, a set screw 28 is provided at the outer surface of cylindrical wall 31 to prevent such relative rotation where the entire kaleidoscope 13—as a whole—is to be rotated, as explained hereinafter.

FIG. 4 illustrates driving assembly 16 of the kaleidoscopic system 10 of FIG. 1 in more detail.

As shown, the driving assembly 16 includes a drive motor 40 having a drive shaft 41 journalled to a drive cam 42, and a series of rollers 43 upon which the kaleidoscope 13 is positioned. Note that contact between the shell 20 of the kaleidoscope 13 and rollers 43 is over a small sector of their circumferences and such contact is maintained by gravity alone. The rollers 43 attach to the platform 19a of the housing 19 via a series of upright U-shaped supports 44 having openings (not shown) through which bolts 45 extends to a define a series of horizontal axes of rotation 46 for the rollers 43. In order to drive the kaleidoscope 13 in rotation about its axis of symmetry A, one of the rollers 43, namely roller 43a is placed in sector contact with drive cam 42 of the drive motor 40. In this regard, the drive cam 42 may be provided with an outer cover of rubber or the like to increase the coefficient of friction acting between the drive cam 42 and the drive roller 43a. Note that the speed of rotation is a direct function of both speed of the drive shaft 41 and the ratio of the diameters of the drive cam 42 and the roller 43a. In this regard, with a shaft speed of four rpm, a drive cam diameter of one-and-one-half inches and a roller wheel diameter of three-and-one-half inches, the kaleidoscope 13 rotates at about two rpm. In this regard, the drive motor 40 made by Hankscraft, Reedsburg, Wis., rated at 2 RPM has been found to be adequate.

FIG. 5 illustrates lighting assembly 12 of the kaleidoscopic system 10 of FIG. 1 in more detail.

As shown, the lighting assembly 12 includes the lamp 11 of high voltage, say 100 watts at 12 volts DC having projection mirrors such as General Electric Lamp EFP, that is seated within a socket 51 of a support 52. Electrical power for the lamp 11 as well as for drive motor 40 of FIGS. 1 and 4, is sourced from a conventional AC source through a AC-to-DC transformer 53 (see FIG. 1) that provides a low DC output, say 12 volts at 10 amperes and is positioned within cavity 50 of the housing 19. Also positioned within the cavity 50 are toggle switch panel 54 and plug receptacle 55. At the side of the lamp 11 is a fan 57 also connected to transformer 53 through the switch panel 54 and plug receptacle 55. In this regard, note that the lamp 11 is opened to air flow bacause of its sole support at the socket 51 frees the space at the sides of the lamp 11 from obstructions. Air current thus can flow across the lamp 11 and object box 30 of the kaleidoscope 13 unimpeded. Cooling to reduce the ambient temperature within the kaleidoscope 13 below melting, are maximized. In this regard, note that the transformer 53 is of conventional design and a model purchased from Lambda De Mexico has been found to be adequate. Likewise, 12 volt DC brushless fan 57 such as manufactured by Archer provides sufficient cooling for operations of the system 10 of the present invention.

FIG. 6 illustrates diverging lens and focusing assembly 14 in more detail.

As shown, the lens and focusing assembly 14 includes hand focusing diverging lens 70 such as a 254 mm lens manufactured by Wollensak, Rochester, N.Y. (Model LE-2(2)) that is attached via a sled mount 71 to the platform 19a of the housing 19. Upwardly extending from the sled mount 71 is a apertured support 72. The support 72 attaches the lens 70 relative to the sled mount 71. As shown best in FIG. 6, the sled mount 71 comprises a stationary channel support 75, a movable support 76 attached to the apertured support 72 through base plate 77 that is coextensive of the sled mount 71. The stationary channel support 75 is provided with a lipped cavity 78 into which the movable support 76 is positioned. In operation, the lens and focusing assembly 14 is adjusted using both adjustment of the lens and focusing assembly 14 in an axial direction relative to the kaleidoscope 13, viz., in the direction of arrows 80, as well as change in the focal length by rotation of the outer housing 81 of the lens 70. Adjustments cease when the kaleidoscopic images at the screen 15 are in focus and of the correct lateral and transverse dimensions to fill the screen 15 to a maximum.

METHOD ASPECTS

In accordance with method aspects, the present invention also sets forth steps in which group viewing of kaleidoscopic images is provided, viz., the steps of:

(i) positioning a conventional kaleidoscope on a planar surface where the kaleidoscope includes a tube, an eye piece at one end of the tube, an object box including a cavity filled with pattern generating objects and transparent wall means at the other end and mirror means therebetween, (ii) rotating the kaleidoscope about its longitudinal axis of symmetry.

(iii) directing light from an high intensity lamp through the object box of the kaleidoscope while maintaining temperatures within the object box below the melting point of the transparent wall means and the pattern generating objects, (iv) re-directing, enlarging and then projecting kaleidoscopic images at the eye piece of the kaleidoscope onto a rear projection screen whereby group viewing of the projected kaleidoscopic images are enjoyed and wherein the projected kaleidoscopic images are of increased lateral and transverse dimension that remains constant as the latter images change as a function of rotation of the kaleidoscope.

Note that where the kaleidoscope of step (i) is separately marketable as a unit product, sales to customers are especially enhanced.

It is understood that various changes and modifications in the form, construction and arrangement of the kaleidoscopic system of the present invention can be made by those skilled in the art without departing from the nature and principles of the invention. For example, the system can be reduced in size to provide a dynamically operating kaleidoscopic system for presentation on a continuous manner where group viewing is present, if desired.

What is claimed is:

1. A kaleidoscopic system for viewing kaleidoscopic images on a screen external of a conventional kaleidoscope, comprising:

(i) a portable housing including a platform;

(ii) a high intensity lamp mounted on said platform connected to a source of electrical energy;

(iii) a kaleidoscope movably positioned on said platform including a tube of circular cross section having a longitudinal axis of symmetry, a side wall defining interior and exterior surfaces, first and second circumferential ends, a closure band of U-shaped cross section attached to and about said first circumferential end in contact with said exterior surface, a closure annular wall having L-shaped, elongated edges captured between said interior surface of said tube and said closure band, an eye piece of circular cross section in facewise contact with said annular wall and said interior surface of said tube, an object box at said second circumferential end of said tube, said box including a cylindrical member telescoping from said circumferential end of said tube, said cylindrical member having a side wall defining an interior surface and first and second flanged ends pointed toward said axis of symmetry, first and second collars in contact with said interior surface of said cylindrical member between said flanged ends, first and second transparent discs axial spaced apart in contact with said interior surface of said cylindrical member, in face-to-face surface contact with said first flanged end of said cylindrical member, said first collar and said second collar, said first and second discs being pointed at said lamp defining a cavity filled with a multiplicity of loosely assorted pattern producing objects of irregular shape, and reflector means within said tube in contact with said eye piece and said said second transparent disc providing kaleidoscopic images at said eye piece of said pattern producing objects, said objects and said first and second transparent discs adjacent to said lamp having a relatively high melting temperature to withstand heat generated by said lamp whereby said kaleidoscope is a separately marketable unit product in and of itself.

(iv) drive means mounted to said platform in frictional contact with said kaleidoscope for sole support thereof wherein said kaleidoscope as a separately marketable unit can be easily and quickly evaluated, said drive means rotating said entire kaleidoscope relative to said platform at relatively low RPM about said longitudinal axis of symmetry, (v) optical lens and focusing means external of said kaleidoscope for optically receiving, enlarging and projecting said kaleidoscopic images at said eye piece, (vi) a rear projection screen external of said kaleidoscope for viewing said kaleidoscopic images on a continuous basis from a side opposite to original image impingement, whereby group viewing of said kaleidoscopic images are enjoyed and wherein the kaleidoscopic images are of increased lateral and transverse dimension that remains substantially constant as the images change as a function of rotation of said kaleidoscope.

2. The kaleidoscopic system of claim 1 in which said lamp is connected to said source of electrical energy through a switch panel and AC-to-DC transformer.

3. The kaleidoscopic system of claim 1 in which said drive means in frictional contact with said kaleidoscope includes a drive motor mounted to said platform connected to said source of electrical energy, said drive motor including a shaft attached to a drive cam, a series of rollers in sector contact with said kaleidoscope, said rollers also being mounted to said platform at a horizontal contact plane between said platform and said axis of symmetry of said kaleidoscope to provide gravity attachment therebetween, and including at least one roller in simultaneous driving sector contact with said drive cam whereby said kaleidoscope is caused to rotate as a function of drive motor shaft rotation.

4. The kaleidoscopic system of claim 1 with the addition of fan means connected to said source of electrical energy, said fan means also mounted to said platform adjacent to said object box of said kaleidoscope and said lamp to cause cooling thereof during operation of said system.

5. The kaleidoscopic system of claim 1 in which said optical lens and focusing means includes a diverging lens mounted by axial adjustable slid amount to said platform, said optical lens and focusing means also including a sled mount including a movable support disconnectably connected to said platform and permanently attached to said diverging lens wherein received images at said eye piece of said kaleidoscope are enlarged and projected using correct axial displacement of said diverging lens relative to said eye piece.

6. The kaleidoscopic system of claim 1 in which said rear projection screen is mounted normal to said axis of symmetry of said kaleidoscope.

7. The kaleidoscopic system of claim 6 with the addition of a viewing system that includes a U-shaped chamber having side walls and an end frame slotted to receive said screen.

8. A kaleidoscopic system for viewing kaleidoscopic images on a screen external of a conventional kaleidoscope, comprising:
(i) a high intensity lamp connected to a source of electrical energy;
(ii) a kaleidoscope positioned in optical alignment with said lamp and including a tube of circular cross section having a longitudinal axis of symmetry, a side wall defining interior and exterior surfaces, first and second circumferential ends, a closure band of U-shaped cross section attached to and about said first circumferential end in contact with said exterior surface, a closure annular wall having L-shaped, elongated edges captured between said interior surface of said tube and said closure band, an eye piece of circular cross section in facewise contact with said annular wall and said interior surface of said tube, an object box at said second circumferential end of said tube, said box including a cylindrical member telescoping from said circumferential end of said tube, said cylindrical member having a side wall defining an interior surface and first and second flanged ends pointed toward said axis of symmetry, first and second collars in contact with said interior surface of said cylindrical member between said flanged ends, first and second transparent discs axial spaced apart in contact with said interior surface of said cylindrical member, in face-to-face surface contact with said first flanged end of said cylindrical member, said first collar and said second collar, said first and second discs being pointed at said lamp defining a cavity filled with a multiplicity of loosely assorted pattern producing objects of irregular shape, and reflector means within said tube in contact with said eye piece and said said second transparent disc for providing kaleidoscopic images at said eye piece of said pattern producing objects, said objects and said first and second transparent discs adjacent to said lamp having a relatively high melting temperature to withstand heat generated by said lamp whereby said haleidoscope is a separately marketable unit product in and of itself,
(iii) drive means in frictional contact with said kaleidoscope for sole support thereof wherein said kaleidoscope as a separately marketable unit can be easily and quickly evaluated, said drive means rotating said kaleidoscope about said axis of symmetry at relatively low RPM,
(iv) optical lens and focusing means external of said kaleidoscope for optically receiving, enlarging and projecting said kaleidoscopic images at said eye piece,
(v) a rear projection screen means external of said kaleidoscope including a screen for viewing said kaleidoscopic images on a side opposite of original image impingement on a continuous basis whereby group viewing of said kaleidoscopic images are enjoyed and wherein the kaleidoscopic images are of increased lateral and transverse dimension that remains substantially constant as the images change as a function of rotation of said kaleidoscope.

9. The kaleidoscopic system of claim 8 in which said lamp is connected to said source of electrical energy through a switch panel and AC/DC transformer.

10. The kaleidoscopic system of claim 8 in which said drive means in frictional contact with said kaleidoscope includes a drive motor mounted adjacent to said kaleidoscope and connected to said source of electrical energy, said drive motor including a shaft attached to a drive cam, a series of rollers in sector contact with said kaleidoscope, said rollers also including at least one roller in simultaneous driving sector contact with said drive cam whereby said kaleidoscope is caused to rotate as a function of drive motor shaft rotation, said rollers also being mounted to said kaleidoscope at a contact plane below said axis of symmetry of said kaleidoscope to provide gravity attachment therebetween without external supports.

11. The kaleidoscopic system of claim 8 with the addition of fan means connected to said source of electrical energy, said fan means being mounted adjacent to said object box of said kaleidoscope and said lamp to cause cooling thereof during operation of said system.

12. The kaleidoscopic system of claim 8 in which said optical lens and focusing means includes a diverging lens mounted by axial adjustable slide mount adjacent to said eye piece of said kaleidoscope, said optical lens and focusing means also including a sled mount including a movable support permanently attached to said diverging lens wherein received images at said eye piece of said kaleidoscope are enlarged and projected using correct axial displacement of said diverging lens relative to said eye piece.

13. The kaleidoscopic system of claim 8 in which said screen of said rear projection screen means is mounted normal to said axis of symmetry of said kaleidoscope.

14. The kaleidoscopic system of claim 13 with the addition of a U-shaped chamber open at one end adjacent to said eye piece of said kaleidoscope, said chamber having side walls and an end frame slotted to receive said screen.

15. A method of providing group viewing of a conventional kaleidoscope, comprising the steps of:
(i) positioning a conventional kaleidoscope on a planar surface where the kaleidoscope includes a tube of circular cross section having a longitudinal axis of symmetry, a side wall defining interior and exterior surfaces, first and second circumferential ends, a closure band of U-shaped cross section attached to and about said first circumferential end in contact with said exterior surface, a closure annular wall having L-shaped, elongated edges captured between said interior surface of said tube and said closure band, an eye piece of circular cross section in facewise contact with said annular wall and said interior surface of said tube, an object box at said second circumferential end of said tube, said box including a cylindrical member telescoping from said circumferential end of said tube, said cylindrical member having a side wall defining an interior surface and first and second flanged ends pointed toward said axis of symmetry, first and second collars in contact with said interior surface of said cylindrical member between said flanged ends, first and second transparent discs axial spaced apart in contact with said interior surface of said cylindrical member, in face-to-face surface contact with said first flanged end of said cylindrical member, said first collar and said second collar, said first and second discs defining a cavity filled with pattern producing objects, and mirror means within said tube in contact with said eye piece and said second transparent disc providing kaleidoscopic images at said eye piece of said pattern producing objects, said objects and said first and second transparent discs having a relatively high melting temperature whereby said kaleidoscope is a separately marketable unit product in and of itself, (ii) rotating the kaleidoscope about its longitudinal axis of symmetry wherein the conventional kaleidoscope can be easily and quickly evaluated, (iii) directing light from an high intensity lamp through the object box of the kaleidoscope while maintaining temperatures within the object box below the melting point of the transparent wall means and the pattern generating objects, (iv) re-directing, enlarging and then projecting kaleidoscopic images at the eye piece of the kaleidoscope onto a rear projection screen whereby group viewing of the projected kaleidoscopic images are enjoyed and wherein the projected kaleidoscopic images are of increased lateral and transverse dimension that remains substantially constant as the latter images change as a function of rotation of the kaleidoscope.

16. The method of claim 15 in which step (i) is further characterized by the kaleidoscope being supported by a series of rollers in sector contact with the tube of the kaleidoscope at said support plane over portions of the circumferences thereof, and wherein one of the rollers is driven into rotation by a drive cam attached to a drive motor at a contact plane below the axis of symmetry of the kaleidoscope whereby gravity contact therebetween permits easy evaluation of the kaleidoscope.

17. The method of claim 15 in which step (iii) includes the substep of directing cooling wind over the object box of the kaleidoscope and lamp to reduce ambient temperature within said kaleidoscope.

* * * * *